United States Patent [19]

McArdle

[11] 4,343,967

[45] Aug. 10, 1982

[54] AUTOKEY CODE GENERATOR

[75] Inventor: Beryl L. McArdle, Rochester, N.Y.

[73] Assignee: General Dynamics Corporation Electronics Division, San Diego, Calif.

[21] Appl. No.: 146,871

[22] Filed: Feb. 28, 1950

[51] Int. Cl.³ .............................................. H04L 9/04
[52] U.S. Cl. ............................. 178/22.19; 178/22.14; 178/22.17; 179/1.5 R
[58] Field of Search ............... 179/1.5, 15.6, 15.6 PC, 179/1.5 R; 250/6.6, 9.11, 9.21, 27 TR, 27 GT, 27 CC, 27 PS; 178/43.5, 22, 22.14, 22.17, 22.19; 235/61 PB, 61 PE

[56] References Cited

U.S. PATENT DOCUMENTS

| 2,404,047 | 7/1946 | Flory et al. . | |
|---|---|---|---|
| 2,409,229 | 10/1946 | Smith et al. . | |
| 2,517,587 | 8/1950 | Mohr | 179/1.5 R |
| 2,519,184 | 8/1950 | Grosdorf . | |
| 2,536,808 | 1/1951 | Higinbotham . | |
| 2,538,615 | 1/1951 | Carbrey . | |
| 2,539,014 | 1/1951 | Frantz . | |
| 2,559,499 | 7/1951 | Gillette et al. . | |
| 2,570,716 | 10/1951 | Rochester . | |
| 2,577,015 | 12/1951 | Johnson . | |

Primary Examiner—Howard A. Birmiel

EXEMPLARY CLAIM

1. In an autokey code generator for use in secret communication systems, the combination of a source of cipher text code in pulse form; a source of reset pulses having a repetition period equal to the cipher text code interval; a dynamic pulse storage network including an input connected to said source of cipher test code, a plurality of stages connectable in sequence to step the pulses of said cipher text code along said sequence under control of said reset pulses; each said stage except the first having at least one output, matrix means having a plurality of inputs and a plurality of outputs for obtaining at any given instant a signal at one of said outputs, the particular one of said outputs at which said signal is present being dependent on the combination of voltage applied to said inputs, said inputs of said matrix means being respectively connected to said outputs of said stages; each said stage except the first having first and second gate means, said first gate means being connected to transfer the output of the preceding stage to the stage connected thereto, said second gate means being connected to supply reset pulses from said source of reset pulses to the stage individual to said second gate means; said outputs of said matrix means being divided into first and second groups; said outputs in said first group being connected together to form an autokey code output and said outputs in said second group being connected to individual ones of said first and second gate means for the control thereof, whereby the operation of said stages from said cipher text code fed into said input of said network is modified as determined by the signal configuration present at said outputs of said matrix means.

5 Claims, 3 Drawing Figures

AUTOKEY CODE GENERATOR

This invention relates to autokey code generators and more particularly to such generators for use in secret communication systems. Although not limited thereto, the arrangements of the present invention are particularly adapted for use in communication systems of the type disclosed and claimed in application Ser. No. 131,436, Beryl L. McArdle, filed Dec. 6, 1949 and assigned to the same assignee as the present application.

In communication systems of the type disclosed in the above-mentioned copending patent application, a voltage wave varying in time to represent intelligence, as for example speech, is first converted into a series of discrete samples or counts corresponding to the amplitude of the voltage wave. This operation may be referred to as quantizing. These samples, which may have 16 different values, are then converted into a suitable numerical code, as for example a binary code, in such a manner that each sample is represented by a set or group of marks or spaces, each occupying a different interval of time and hereinafter referred to as a binary digit. The train of binary digits is combined with a second train of marks and spaces which has been randomly developed in accordance with the noise component accompanying the intelligence signal. The resultant combined pulse train is the signal which is transmitted by any suitable means to a receiver at a remote point. At the receiving terminal, arrangements are provided for developing from the combined transmitted pulse train an intelligence signal wave substantially corresponding with the originally transmitted intelligence signal wave.

In systems such as those briefly discussed above, during periods of silence the two most frequent counts appearing in the plain text binary code would be seven and eight, corresponding to the first level below and the first level above the no-signal point in the coding tube. As disclosed and claimed in the above-mentioned patent application, the security is enhanced by developing a low-level random noise signal and injecting it into the speech channel. The amplitude of this noise signal is adjusted so that it is sufficient to modulate the coding tube over the middle four levels, that is, the counts of six, seven, eight and nine. It has been found in practice, however, that thus limiting the counts of the silent intervals to these four levels is not entirely adequate, under all circumstances, to avoid providing a clue which might aid the unauthorized intercepter to decipher the intelligence being transmitted.

It is an object of the present invention, therefore, to provide means for enhancing the security achieved in secret communication systems.

It is another object of the present invention to provide means, in a secret communication system, to break up the pulse patterns of the autokey code groups which are obtained in the presence of low-level random noise. By this I mean that the interval before a given pulse pattern is complete and starts repeating is prolonged through the use of my invention.

It is a further object of the present invention to provide an improved dynamic pulse storage network which is especially adapted for use in an arrangement for breaking up the autokey code groups which would otherwise normally correspond with the presence of low-level random noise.

The present invention contemplates an autokey generator adapted for use in a secret communication system. This generator comprises the combination of a dynamic pulse storage network having a plurality of stages connected in sequence, control means individual to the stages and matrix means. The outputs of the stages are connected to the inputs of the matrix means. Some of the outputs of the matrix means are connected together to furnish the autokey code, and the remainder of the outputs are connected to the control means to furnish control signals therefor. Thus the autokey code generator of my invention provides maximum secrecy by continuously modifying its operation, the modifying influence therefor being derived from the combination itself. Additional secrecy may be obtained by arranging the outputs of the matrix leading to the control means to be connectible, as by means of selective switches in any desired order and combination to the control means. A cross-wired wheel may also be included between the matrix and the control means for further secrecy in answering.

The above and other objects and features of the present invention may be better understood by referring to the following description taken in connection with the accompanying drawings, in which like components are designated by like reference numerals and in which.

Figure 1:
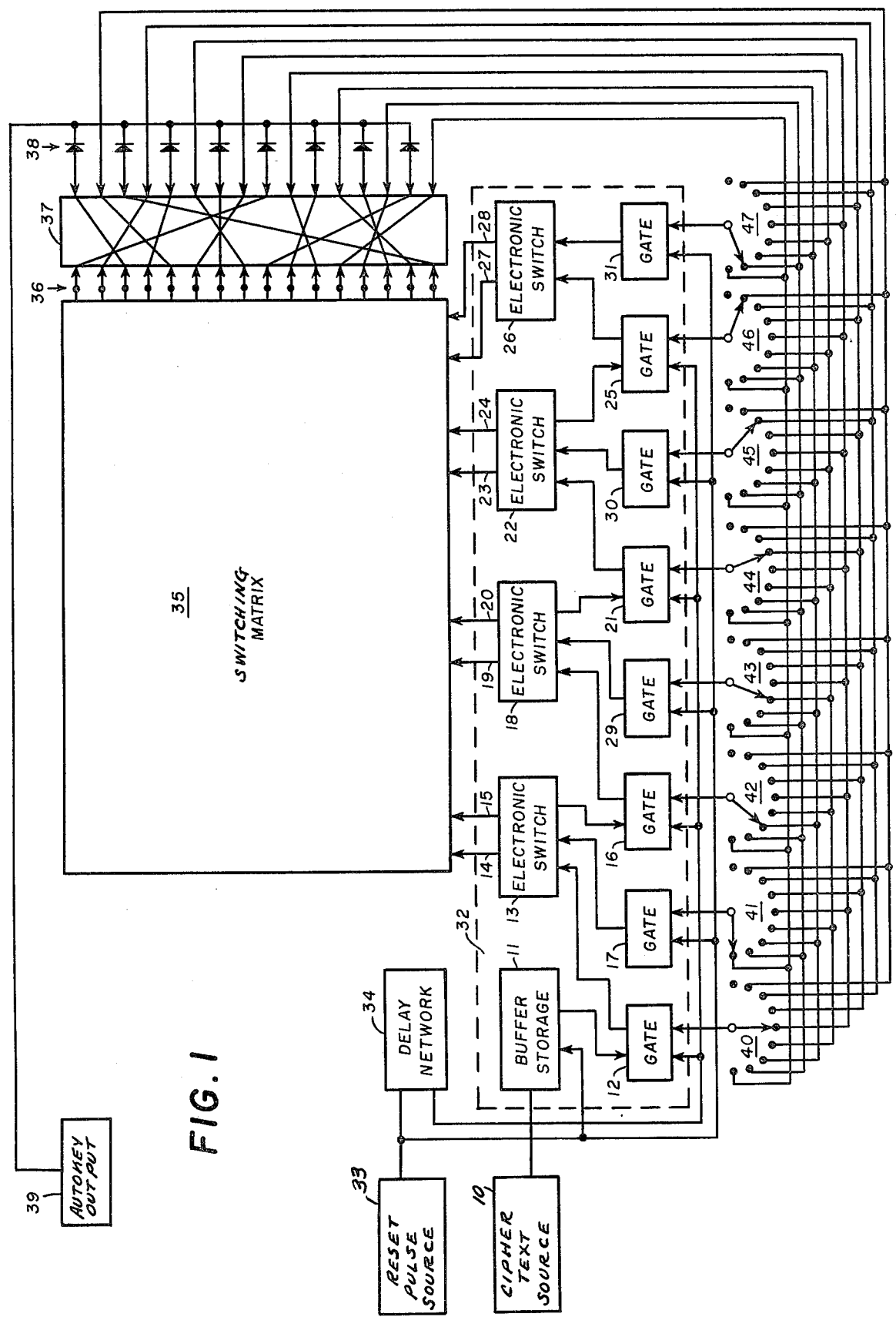
FIG. 1 is a schematic diagram, partly in block form, of an autokey generator in accordance with the present invention.

Referring now to the drawings, there is shown in FIG. 1 a schematic diagram of an autokey generator which is especially suited for providing an autokey code comprising a train of pulses, for combination in a cipher text generator with the plain text binary code or with a coded text code in a secret communication system of the type disclosed and claimed in the above-mentioned copending patent application. In order that these pulses may be as nearly randomly disposed as possible, an arrangement is provided in accordance with the present invention for developing a pulse train in which the disposition of the pulses is in part a function of the nature of the four preceding binary digits of the code supplied to the input of the autokey generator. In this connection, it is pointed out that the choice of four preceding digits instead of some other number of preceding digits is entirely arbitrary, being based principally upon considerations of compactness and complexity. Since the preceding four digits are dependent on the nature of the four digits preceding them, and those on the ones before them, it is apparent that even with a constantly repetitive digit input, the period before repetition of the pulse pattern occurs is many times longer than a four-digit interval.

As an additional feature of the present invention, additional means are provided for still further complicating the autokey code in a manner which may be pre-set by the operator and readily changed to provide a very large combination of possible rearrangements of the autokey code compared with the arrangement which would result were these additional means not to be employed.

As shown in FIG. 1, there is provided an input terminal 10 to which is applied the cipher text code developed at the transmitter (not shown) of the communication system in which the autokey generator of the present invention is to be used. Input terminal 10 is connected to a buffer storage unit 11, the purpose of which is to temporarily store each pulse. The output of buffer storage unit 11 is supplied through a gate 12 to an electronic switch 13 which is preferably a trigger circuit of the Eccles-Jordan type. Unit 13 has first and second outputs, represented by leads 14 and 15, and a third output which is supplied to a gate 16. Unit 13 is also controlled by a gate 17.

The output of gate 16 is supplied to an electronic switch 18, the first and second outputs of which appear at leads 19 and 20 and the third output of which is supplied through a gate 21 to an electronic switch 22. The first and second outputs of electronic switch 22 are represented by leads 23 and 24, and the third output of this switch is supplied through a gate 25 to an electronic switch 26 having first and second outputs represented by leads 27 and 28. Gates 29, 30 and 31, respectively, provide additional control of the operation of electronic switches 18, 22 and 26.

Buffer storage unit 11, electronic switches 13, 18, 22 and 26, and gates 12, 16, 17, 21, 25, 29, 30 and 31 collectively comprise a dynamic pulse storage network indicated generally by the reference numeral 32. For the purpose of periodically resetting network 32, suitable reset pulses are supplied to terminal 33 following each binary digit of the pulse train applied to terminal 10. Terminal 33 is connected to buffer storage unit 11 and to gates 17, 29, 30 and 31. This terminal is also connected, through a delay network 34, to gates 12, 16, 21 and 25, so that suitably delayed reset pulses are supplied to these gates.

The dynamic pulse storage network indicated generally by reference numeral 32 comprises in essence a group of four double-pole, double-throw electronic switches which are practically instantaneous in operation. These switches are used to control the operation of matrix means such as a diode matrix indicated generally at 35 by establishing different combinations of potential on leads 14, 15, 19, 20, 23, 24, 27, and 28. Such a matrix may employ a plurality of rectifier elements, which may preferably be of the germanium diode type. The details of the matrix form no part of the present invention. A matrix suitable for use in the autokey generator of the present invention is described in a paper entitled, "Rectifier Networks for Multi-Position Switching" by D. R. Brown and N. Rochester, appearing at pages 139–147 of the Proceedings of the I.R.E. for February 1949 or in the above-identified application.

Matrix 35, as shown in the embodiment of FIG. 1, has a total of sixteen separate output terminals indicated generally at 36. The purpose of the matrix is to determine at which single one of these terminals an output pulse is to appear during the interval corresponding to each binary digit. As disclosed in the aforementioned paper and application, a diode matrix is a multi-position switch having a plurality of outputs and a plurality of inputs. Only one of the outputs is selected, i.e., provided with an output potential such as a pulse, for example, at any given time during any given digit interval for any given combination of input potentials. As the operation of the network 32 causes the electronic switches 13, 18, 22, and 26 to assume different conditions, the potentials on the leads 14, 15, 19, 20, 23, 24, 27, and 28 have different combinations of potentials and each combination results in the selection of a different output. Other types of matrices may be used instead of a diode matrix with similar results. In order further to enhance the secrecy of the system in which the autokey generator of the present invention is to be used, the output pulse appearing at one of output terminals 36 of matrix 35 is not utilized directly, but is first passed through one or more cross-wired key-setting wheels, one of which is indicated diagrammatically at 37. A suitable wheel is illustrated and claimed in copending application of Pierre J. Tapernoux, Ser. No. 199,671, filed Dec. 7, 1950, and assigned to the same assignee as the inventions disclosed herein. This wheel, which may readily be arranged for rotation to alter the type of coding being developed, effectively shifts the relative position of the output terminals in the sequence of the autokey code. If desired, a differently wired wheel may be substituted still further to increase the number of autokey codes available, and additional security may be achieved by subjecting the wheel to rotational stepping at predetermined intervals. An important feature of the present invention is to provide an arrangement which operates electronically to simulate such rotational stepping. Alternate outputs of wheel 37 are picked off and passed through mixer-rectifiers collectively indicated at 38, a connection being made to these rectifiers to provide a common autokey output at terminal 39.

The remaining outputs of wheel 37 are connected in the manner shown to the contacts of multi-position, single-pole switches 40–47. Each of switches 40–47 has one contact to which no connection is made. The movable arms of switches 40–47 are connected respectively to gates 12, 17, 16, 29, 21, 30, 25 and 31. Thus it will be apparent that the operation of each of these gates is dependent not only upon the position of wheel 37 but also upon the setting of the corresponding one of switches 40–47. If each of switches 40–47 is adjusted so that its movable arm connects with the contact having no external connection, the autokey generator of FIG. 1 develops an autokey code at terminal 39 which is a function solely of the preceding four binary digits of the pulse train applied to input terminal 10 and of the setting of wheel 37. If one or more of switches 40–47 is given a different setting, however, the developed autokey code is no longer dependent solely upon the preceding four binary digits and upon the setting of wheel 37, but assumes an entirely different pattern which is dependent upon the settings of the switches and hence is only one of many possible different combinations, any one of which may be achieved upon the application of a given series of four binary digits at input terminal 10. For example, in a particular arrangement such as that here shown, employing a four-stage pulse storage network, a 16-wire matrix and eight nine-position switches, a total of 672 combinations is possible for each setting of a given cross-wired wheel, a majority of these combinations being usable in a practical embodiment.

Figure 2:
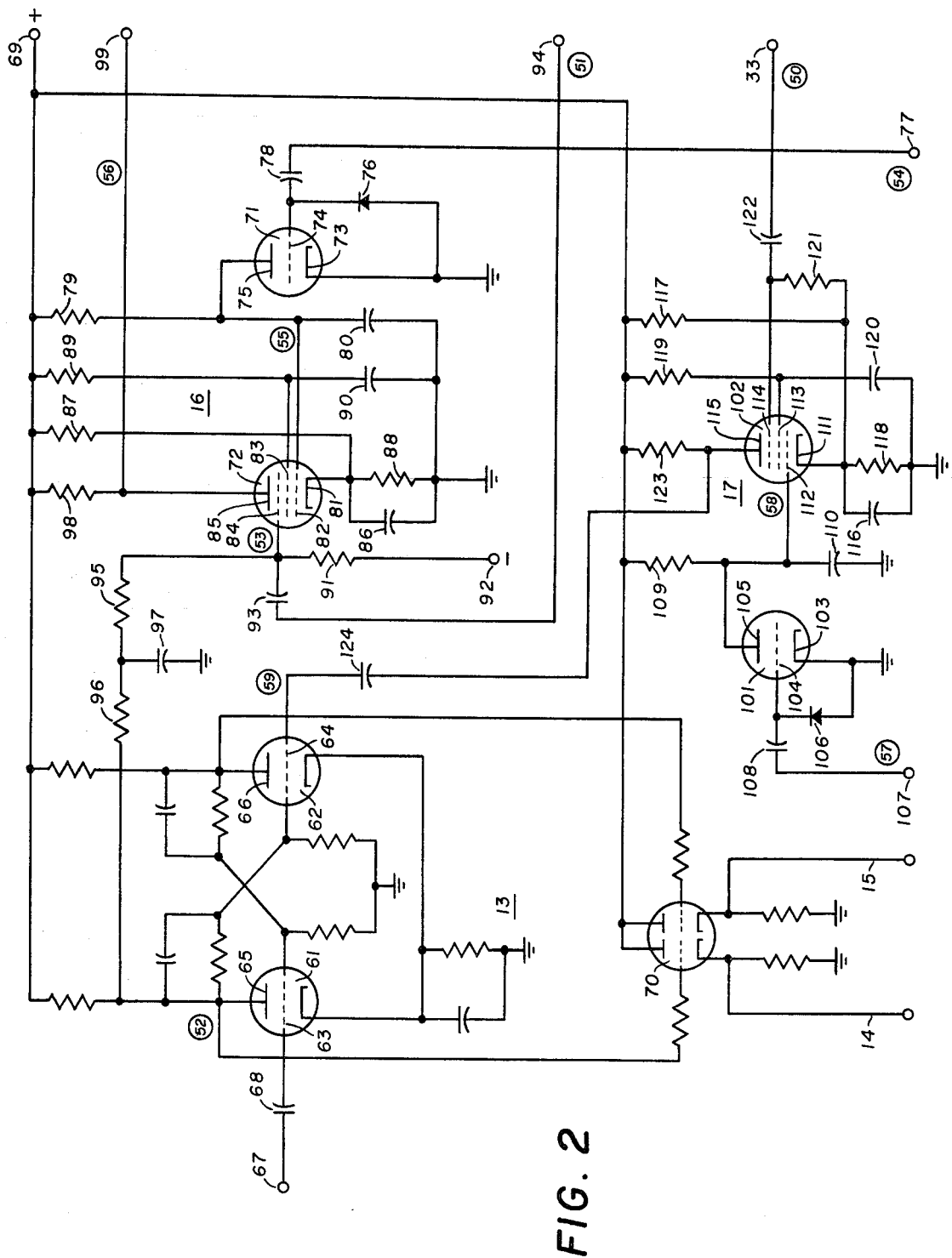
FIG. 2 is a schematic diagram of a portion of a dynamic pulse storage network of a type adapted for use in the autokey generator of FIG. 1.

FIG. 2 is a schematic diagram of units 13, 16 and 17 of FIG. 1, this particular group being chosen as typical of the several similar groups comprising dynamic pulse storage network 32 of FIG. 1. Electronic switch 13 comprises a pair of electron discharge devices 61 and 62, connected in a conventional Eccles-Jordan trigger circuit and having control electrodes 63 and 64 and anodes 65 and 66, respectively. Negative input pulses, representing marks, are applied to input terminal 67 which is coupled by a capacitor 68 to control electrode 63 of discharge device 61. In the absence of an input signal on terminal 67, device 61 is conductive and device 62 is non-conductive, so that the potential of anode 65 of device 61 is low. The application of a negative pulse or mark at terminal 67 renders device 61 non-conductive and device 62 conductive, so that the voltage of anode 65 of device 61 rises substantially to that of the relatively high positive potential source 69.

For the purpose of applying the outputs of switch unit 13 to matrix 35 (FIG. 1), a dual electron discharge device 70 is provided and arranged to function as a pair of cathode followers. The control electrodes are connected respectively to anodes 65 and 66 of devices 61 and 62, and its cathodes are connected to leads 14 and 15. The cathode followers of device 70 serve as buffers to prevent matrix 35 (FIG. 1) from having any undesirable effect upon the operation of electronic switch unit 13.

Gate 16 comprises electron discharge devices 71 and 72. Device 71 is preferably of the triode type having a cathode 73, a control electrode 74, and an anode 75. Cathode 73 is grounded as shown. A rectifier 76, preferably of the crystal type, is connected between control electrode 74 and ground, and serves to maintain this electrode normally at substantially ground potential. A terminal 77, to which is connected the movable arm of switch 42 (FIG. 1) is coupled to control electrode 74 by a capacitor 78. An integrating network, comprising a resistor 79 and a capacitor 80 in series, is connected between positive potential source 69 and ground. Anode 75 of device 71 is connected to the junction of resistor 79 and capacitor 80.

Device 72 is preferably of the sharp-cutoff pentode type such, for example, as Western Electric type 6AS6, having a cathode 81, a control electrode 82, a screen grid 83, a suppressor grid 84, and an anode 85. Cathode 81, which is bypassed to ground by a capacitor 86, is maintained at a suitable positive potential by means of a divider network 87, 88 connected between positive potential source 69 and ground. Control electrode 82 is connected to the junction of resistor 79 and capacitor 80, and thus is always at the same potential as anode 75 of device 71. Screen grid 83 is supplied through a series resistor 89, and is bypassed to ground by a capacitor 90. Suppressor grid 84 is connected by a resistor 91 to a source 92 of negative potential, and is coupled by a capacitor 93 to a terminal 94 to which are applied delayed reset pulses from delay network 34 (FIG. 1). Resistors 95 and 96 in series are connected between suppressor grid 84 and anode 65 of device 61, and a capacitor 97 is connected between ground and the junction of resistors 95 and 96. Resistor 96 and capacitor 97 comprise an integrating network. A load resistor 98 is connected between positive potential source 69 and anode 85, and an output terminal 99, to which is connected electronic switch 18 (FIG. 1), is connected to anode 85.

Gate 17, which is very similar in construction to gate 16, comprises electron discharge devices 101 and 102. Device 101 is preferably of the triode type having a cathode 103, a control electrode 104, and an anode 105. Cathode 103 is grounded as shown. A rectifier 106, preferably of the crystal type, is connected between control electrode 104 and ground, and serves to maintain this electrode normally at substantially ground potential. A terminal 107, to which is connected the movable arm of switch 41 (FIG. 1) is coupled to control electrode 104 by a capacitor 108. An integrating network, comprising a resistor 109 and a capacitor 110 in series, is connected between positive potential source 69 and ground. Anode 105 of device 101 is connected to the junction of resistor 109 and capacitor 110.

Device 102, preferably of the same type as device 72, has a cathode 111, a control electrode 112, a screen grid 113, a suppressor grid 114, and an anode 115. Cathode 111, which is bypassed to ground by a capacitor 116, is maintained at a suitable positive potential by means of a divider network 117, 118 connected between positive potential source 69 and ground. Control electrode 112 is connected to the junction of resistor 109 and capacitor 110, and thus is always at the same potential as anode 105 of device 101. Screen grid 113 is supplied through a series resistor 119, and is bypassed to ground by a capacitor 120. A resistor 121 is connected between suppressor grid 114 and cathode 111, and suppressor grid 114 is coupled by a capacitor 122 to terminal 33 to which are applied positive reset pulses as discussed in connection with FIG. 1. Due to the action of resistor 121 and capacitor 122, suppressor grid 114 is maintained sufficiently negative to cut off device 102 between reset pulses, this device becoming conductive only during these pulses. A load resistor 123 is connected between positive potential source 69 and anode 115. The latter anode is coupled by a capacitor 124 to control electrode 64 of device 62.

Figure 3:
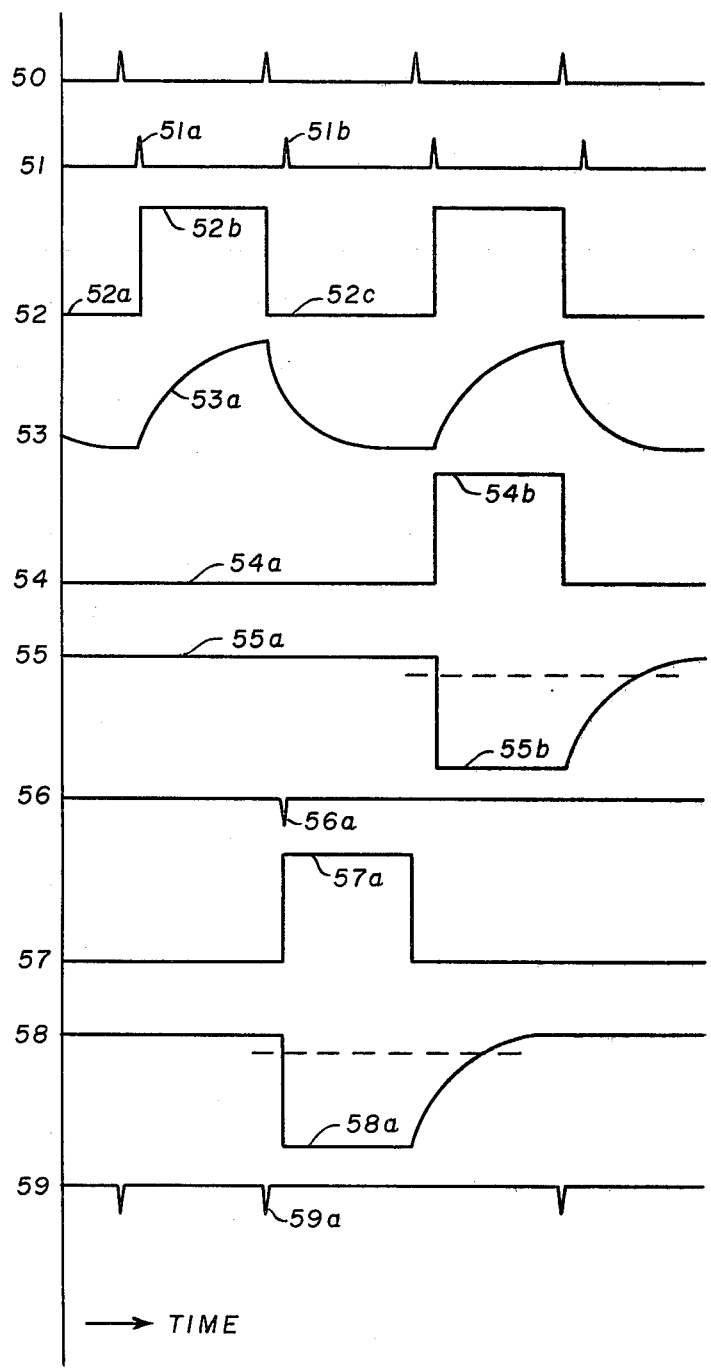
FIG. 3 is a graphical representation, to a common time base, of the approximate waveforms which may exist at various points in the arrangement of FIG. 2, these points being indicated by the encircled reference numerals on FIG. 2.

The operation of the arrangement of FIG. 2 will be better understood by reference to FIG. 3. Curve 50 shows the positive reset pulses which are applied at terminal 33, and curve 51 illustrates the delayed reset pulses which are applied to terminal 94. These two pulse trains have the same repetition rate as the binary digit intervals, and a fixed phase relationship to each other. They are always present when the system as a whole is in operation. Integrating networks 79, 80 and 96, 97 and 109, 110 serve to prolong the effect of a pulse occurring in one digit interval so that it may be utilized in the next digit interval. This is illustrated by curves 55, 53 and 58, respectively.

Let it first be assumed that no pulse, corresponding to a space, is present at input terminal 67. Electron discharge device 61 is conductive, so that the potential at anode 65 is low, as indicated by portion 52a of curve 52. If a negative pulse, corresponding to a mark, now appears at terminal 67, it will coincide in time with delayed reset pulse 51a, and will cause device 61 to become non-conductive, so that the potential at anode 65 is high, as indicated by portion 52b of curve 52. This storage condition continues until device 62 is rendered non-conductive by the application of reset pulse 59a to control electrode 64, which in turn restores device 61 to its normally conductive state, as indicated by portion 52c of curve 52.

The waveform at anode 65 (curve 52) is integrated by resistor 96 and capacitor 97 to provide the waveform of curve 53, which is applied to suppressor grid 84 of device 72, thereby partially overcoming the normally negative potential on this grid due to negative potential source 92. Assuming for the moment that there is zero voltage at terminal 77, as indicated by portion 54a of curve 54, and hence that device 71 is sufficiently conductive that control electrode 82 of device 72 is above cutoff potential, as indicated by portion 55a of curve 55, the application of positive delayed reset pulse 51b to suppressor grid 84 is sufficient to render device 72 conductive. A corresponding output pulse 56a is thus developed at output terminal 99. It will be apparent that triple coincidence is required to achieve this result. In the first place, a portion 53a of an integrated wave corresponding to a stored pulse or mark must be present at suppressor grid 84. Secondly, device 72 must not be rendered non-conductive due to the presence of a positive voltage on terminal 77 (curve 54). Thirdly, a delayed reset pulse must be present at terminal 94 (curve 51). Under these conditions, therefore, a mark at input terminal 67 results in the development of a mark at output terminal 99. A space at the input results in a space at the output.

Let it now be assumed that, due to the action of matrix 35, cross-wired wheel 37 and switch 42 (FIG. 1), a positive voltage is present at terminal 77, as illustrated by portion 54b of curve 54. This positive voltage causes device 71 to become highly conductive so that the potential at its anode 75, and hence at control electrode 82 of device 72, is low, as indicated by portion 55b of curve 55. Device 72 is thus rendered non-conductive, so that potentials appearing at its suppressor grid 84 cannot produce output pulses at terminal 99. Thus a mark at input terminal 67 results in a space at output terminal 99, and a space at the input also results in a space at the output. In this manner, a first element of randomness is introduced in accordance with the invention without affecting the operation of switch 13 and hence of matrix 35 (FIG. 1).

Up to this point it has been assumed that gate 17 is conductive, that is, that reset pulses (curve 50) at terminal 33 are permitted to reach control electrode 64 of device 62 and to periodically reset switch 13 to its normal or non-storage condition. In this case, a mark at input terminal 67 triggers switch 13 and it is restored by the next reset pulse. A space, however, has no effect upon the switch. Now let it be assumed that, due to the action of matrix 35, cross-wired wheel 37 and switch 41 (FIG. 1), a positive voltage is present at terminal 107, as illustrated by portion 57a of curve 57. This positive voltage causes device 101, which is normally only slightly conductive, to become highly conductive so that the potential at its anode 105, and hence at control electrode 112 of device 102, is low, as indicated by portion 58a of curve 58. Device 102 is thus rendered non-conductive, so that potentials appearing at its suppressor grid 114 cannot produce pulses at control electrode 64 of device 62.

Under these conditions, a mark during a first digit interval at input terminal 67 triggers switch 13 and results in a mark at output terminal 99. No reset pulse is permitted to reach control electrode 64 of device 62, so switch 13 remains triggered and a mark is produced at output terminal 99 during the second digit interval regardless of whether a mark or a space is present at input terminal 67 during this second digit interval. If a space is present at input terminal 67 during the first digit interval, switch 13 remains untriggered and a space appears at output terminal 99. There is no carryover effect upon the operation during the second digit interval. In this manner, therefore, a second element of randomness is introduced in accordance with the invention. The effect of this second element is twofold. It directly affects the transmission of the information in each digit interval through storage network 32, and it indirectly affects the operation of the system as a whole since, acting on switch 13, it necessarily influences the operation of matrix 35.

Referring again to FIG. 1, the exact effect of the first element of randomness is determined by the settings of switches 40, 42, 44 and 46, while that of the second element depends upon the settings of switches 41, 43, 45 and 47. It will be apparent, therefore, that the arrangements of the present invention permit the security realizable with a given secret communication system to be greatly enhanced. Although shown by way of example as used in a four-digit system, the arrangements of the present invention are equally adaptable for use in systems with codes having different numbers of digits, as for example teletypewriter systems using codes such as the five-digit Baudot code.

While there has been described what is at present considered the preferred embodiment of the invention, it will be obvious to those skilled in the art that various changes and modifications may be made therein without department from the invention, and it is, therefore, aimed in the appended claims to cover all such changes and modifications as fall within the true spirit and scope of the invention.

What is claimed is:

1. In an autokey code generator for use in secret communication systems, the combination of a source of cipher text code in pulse form; a source of reset pulses having a repetition period equal to the cipher text code interval; a dynamic pulse storage network including an input connected to said source of cipher text code, a plurality of stages connectable in sequence to step the pulses of said cipher text code along said sequence under control of said reset pulses; each said stage except the first having at least one output, matrix means having a plurality of inputs and a plurality of outputs for obtaining at any given instant a signal at one of said outputs, the particular one of said outputs at which said signal is present being dependent on the combination of voltage applied to said inputs, said inputs of said matrix means being respectively connected to said outputs of said stages; each said stage except the first having first and second gate means, said first gate means being connected to transfer the output of the preceding stage to the stage connected thereto, said second gate means being connected to supply reset pulses from said source of reset pulses to the stage individual to said second gate means; said outputs of said matrix means being divided into first and second groups; said outputs in said first group being connected together to form an autokey code output and said outputs in said second group being connected to individual ones of said first and second gate means for the control thereof, whereby the operation of said stages from said cipher text code fed into said input of said network is modified as determined by the signal configuration present at said outputs of said matrix means.

2. The combination of claim 1 in which the outputs of said second group are connectible in any desired order and combination to said first and second gate means.

3. The combination of claim 1 in which selective switch means are inserted between said outputs of said matrix means and said first gate means, whereby any of said outputs of said matrix means may be selected to control said first gate means.

4. The combination of claim 1 in which selective switch means are inserted between said outputs of said matrix means and said second gate means whereby any of said outputs of said matrix means may be selected to control said second gate means.

5. The combination of claim 1 to which is added a cross-wired code wheel having inputs and outputs and including means for interconnecting said inputs and said outputs in a plurality of combinations, said inputs of said wheel being connected to said outputs of said matrix means and the outputs of said wheel being connected to said control means.

* * * * *